United States Patent [19]

Moser et al.

[11] Patent Number: 5,486,213
[45] Date of Patent: Jan. 23, 1996

[54] PROCESS FOR THE DYEING OF LEATHER WITH DYE MIXTURES

[75] Inventors: Peter Moser, Binningen, Switzerland; Campbell T. Page, Efringen-Kirchen, Germany; Alois Püntener, Rheinfelden, Switzerland

[73] Assignee: Ciba-Geigy Corporation, Tarrytown, N.Y.

[21] Appl. No.: 80,795

[22] Filed: Jun. 22, 1993

[30] Foreign Application Priority Data

Jun. 30, 1992 [CH] Switzerland ............... 2039/92

[51] Int. Cl.$^6$ ....................... D06P 1/06
[52] U.S. Cl. ............. 8/437; 8/436; 8/641; 8/687; 8/688
[58] Field of Search ............... 8/436, 437, 641, 8/687, 688

[56] References Cited

U.S. PATENT DOCUMENTS

| | | | |
|---|---|---|---|
| 2,026,092 | 12/1935 | Kränzlein et al. | 260/28 |
| 2,156,887 | 5/1939 | Weinand et al. | 260/374 |
| 3,819,690 | 6/1974 | Bruenisholz et al. | 260/510 |
| 4,318,859 | 3/1982 | Hermann | 260/388 |
| 4,452,602 | 6/1984 | Püntener et al. | 8/437 |
| 4,492,653 | 1/1985 | Sommer et al. | 534/796 |
| 4,652,269 | 3/1987 | Bowles et al. | 8/641 |
| 4,705,865 | 11/1987 | Töpfl | 548/341 |
| 4,988,804 | 1/1991 | Langfeld | 534/684 |
| 5,032,142 | 7/1991 | Egger et al. | 8/437 |
| 5,152,801 | 10/1992 | Altermatt et al. | 8/436 |
| 5,176,717 | 1/1993 | Schaulin et al. | 8/437 |

FOREIGN PATENT DOCUMENTS

| | | |
|---|---|---|
| 14678 | 8/1980 | European Pat. Off. . |
| 168961 | 1/1986 | European Pat. Off. . |
| 253932 | 1/1988 | European Pat. Off. . |
| 348344 | 12/1989 | European Pat. Off. . |
| 3828909 | 3/1990 | Germany . |
| 1260262 | 1/1972 | United Kingdom . |
| 1410862 | 10/1975 | United Kingdom . |
| 1417428 | 12/1975 | United Kingdom . |
| 2125811 | 3/1984 | United Kingdom . |
| 2226336 | 6/1990 | United Kingdom . |

OTHER PUBLICATIONS

Dyes and Textile Chem. (1936) 294 Abst. Af CH 174, 541 Date Not Available.
Chem. Abst. 102:8244C (Sep. 1984).

*Primary Examiner*—Paul Lieberman
*Assistant Examiner*—Caroline L. Dusheck
*Attorney, Agent, or Firm*—George R. Dohmann

[57] ABSTRACT

Dye mixtures comprising at least two metal-free dyes, one of which contains two to eight sulfo groups and the other three to eight sulfo groups, the mixture comprising at most one dye having two sulfo groups, are used for the dyeing of leather. Preferably, a trichromatic dye mixture comprising at least one yellow dye, at least one red dye and at least one blue dye is used. Leather can be dyed with these dye mixtures in brilliant shades.

31 Claims, No Drawings

PROCESS FOR THE DYEING OF LEATHER WITH DYE MIXTURES

The present invention relates to a process for the dyeing of leather with dye mixtures, in particular to a process for the trichromatic dyeing of leather, and to the leather dyed by the process.

Processes for the dyeing of leather with dye mixtures, including trichromatic dyeing of leather, are already known and are very successfully used in practice. However, the known dye mixtures are only suitable to a limited extent for dyeing in brilliant shades, and trichromatic dyeing of leather in brilliant shades has so far not been possible with the known dye mixtures. The reason is that in trichromatic dyeing particular demands are made on the compatibility of the dyes used in order to ensure uniform colour build-up for obtaining reproducible dyeings of constant shade in different concentrations. Moreover, the conditions mentioned should be fulfilled for leather types of different provenience and different pretreatment.

The object of the present invention is to provide a process for the dyeing of leather with dye mixtures by which dyeing in brilliant shades is possible. Moreover, particularly suitable dye mixtures should enable trichromatic dyeing of leather in brilliant shades.

This object is achieved by the process according to the invention.

Accordingly, the invention provides a process for the dyeing of leather with dye mixtures, which comprises using a mixture of at least two metal-free dyes, one of which contains two to eight sulfo groups and the other three to eight sulfo groups, the mixture comprising at most one dye having two sulfo groups.

In a preferred embodiment of the process according to the invention, at least two dyes are used which are selected from the group consisting of a) a yellow dye of the formula

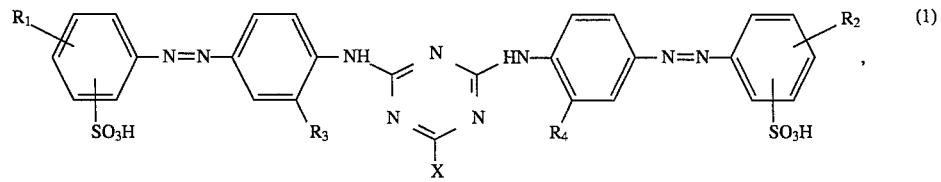

in which
R$_1$ and R$_2$, independently of one another, are each hydrogen, C$_1$–C$_4$alkyl or C$_1$–C$_4$alkoxy,
R$_3$ and R$_4$, independently of one another, are each C$_1$–C$_4$alkyl or C$_1$–C$_4$alkoxy and
X is halogen or

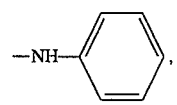

the phenyl radical being unsubstituted or substituted by C$_1$–C$_4$alkyl or C$_1$–C$_4$alkoxy, b) a red dye of the formula

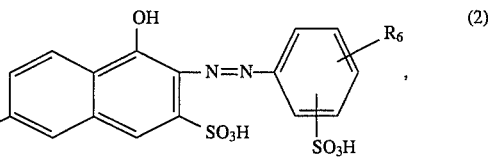

in which
R$_5$ and R$_6$, independently of one another, are each hydrogen, C$_1$–C$_4$alkyl or C$_1$–C$_4$alkoxy and
X$_1$ is halogen or

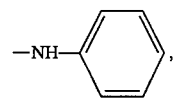

the phenyl radical being unsubstituted or substituted by C$_1$–C$_4$alkyl or C$_1$–C$_4$alkoxy, or of the formula

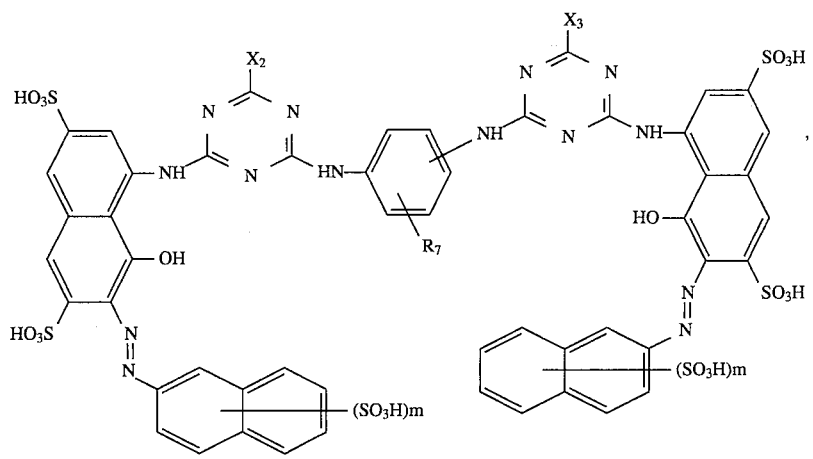

(2a)

in which

X₂ and X₃, independently of one another, are each halogen or

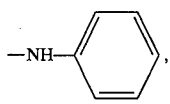

the phenyl radical being unsubstituted or substituted by $C_1$–$C_4$alkyl or $C_1$–$C_4$alkoxy, $R_7$ is hydrogen, $C_1$–$C_4$alkyl or $C_1$–$C_4$alkoxy and m is 1 or 2, and c) a blue dye of the formula

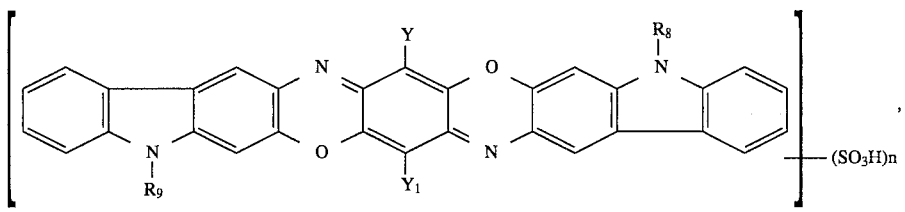

(3)

in which n is 3 or 4, $R_8$ and $R_9$, independently of one another, are each hydrogen or $C_1$–$C_4$alkyl and Y and $Y_1$, independently of one another, are each hydrogen, halogen, $C_1$–$C_4$alkyl, $C_1$–$C_4$alkoxy, phenyl or phenoxy, it being possible for the phenyl radical in the last two groups to be substituted by $C_1$–$C_4$alkyl or $C_1$–$C_4$alkoxy.

The alkyl groups can be linear or branched. Accordingly, suitable $C_1$–$C_4$alkyl radicals are methyl, ethyl, n- or isopropyl and n-, iso-, sec- or tert-butyl. Of these, methyl and ethyl are preferred.

Halogen is fluorine, bromine, iodine or, in particular, chlorine.

Examples of suitable alkoxy radicals are methoxy, ethoxy, propoxy, isopropoxy, n-butoxy, isobutoxy or tert-butoxy, but preferably methoxy or ethoxy.

Preferably, a dye mixture comprising a yellow dye of the formula (1), a red dye of the formula (2) or (2a) and a blue dye of the formula (3) is used for the trichromatic dyeing by the process according to the invention.

In the dyes of the formula (1), $R_1$ preferably has the same meaning as $R_2$, in particular both are hydrogen, methyl or methoxy, in particular hydrogen.

Furthermore, preference is given to the use of those dyes of the formula (1) in which both sulfo groups are in the m position relative to the azo groups.

X in the dyes of the formula (1) is in particular chlorine and especially phenylamino.

In a particularly preferred embodiment of the process according to the invention, the yellow dye of the formula

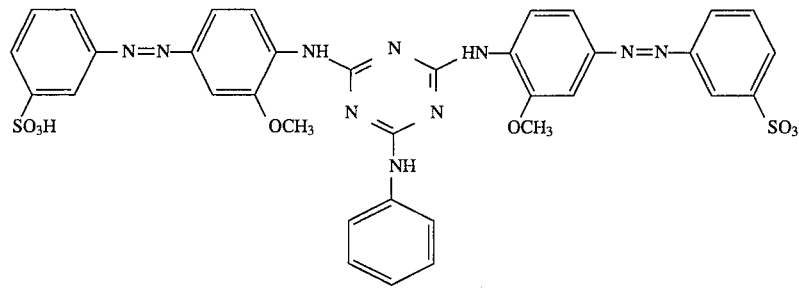

(4)

is used.

In a further preferred embodiment of the process according to the invention, a red dye of the formula (2) is used in which $R_5$ has the same meaning as $R_6$, both preferably being hydrogen, methyl or methoxy, in particular methoxy.

Furthermore, preference is given to the use of those dyes of the formula (2) in which both sulfo groups are in the o position relative to the azo groups.

$X_1$ is in particular phenylamino or phenylamino which is substituted by methyl, ethyl, methoxy or ethoxy. A particularly preferred meaning of $X_1$ is methoxyphenylamino.

In a further preferred embodiment of the process according to the invention, a red dye of the formula (2a) is used in which $R_7$ is hydrogen.

Furthermore, preference is given to those dyes of the formula (2a) in which both triazineamino groups are attached to the $R_7$-substituted phenylene radical in the p position.

$X_2$ and $X_3$ are preferably identical and are both in particular chlorine and m is in particular 2.

In a particularly preferred embodiment of the process according to the invention, the red dye of the formula In a further preferred embodiment of the process according to the invention, a blue dye of the formula (3) in which $R_8$ and $R_9$ are each $C_1$–$C_2$alkyl is used.

Moreover, preference is given to the use of those dyes of the formula (3) in which Y and $Y_1$ are each halogen, in particular chlorine, and of those dyes of the formula (3) in which n is 3.

In a very particularly preferred embodiment of the process according to the invention, the blue dye of the formula

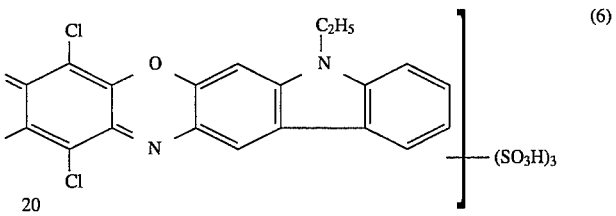

(6)

is used.

In a very particularly important embodiment of the process according to the invention, a dye mixture comprising the yellow dye of the formula (4), the red dye of the formula (5) and the blue dye of the formula (6) is used for trichromatic dyeing.

In addition to the dyes of the formulae (1), (2), (2a) or (3), further dyes can also be used in the dyeing process according to the invention. These may be advantageous, for example, when it is desired that the shade obtainable by the dyes mentioned be duller or darker or have a somewhat different

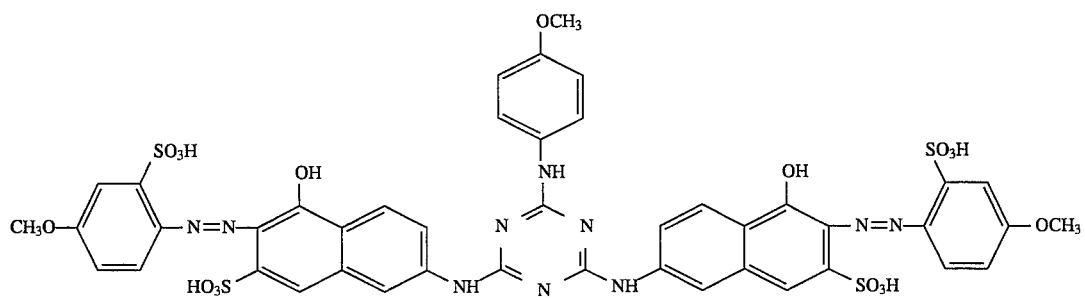

(5)

or

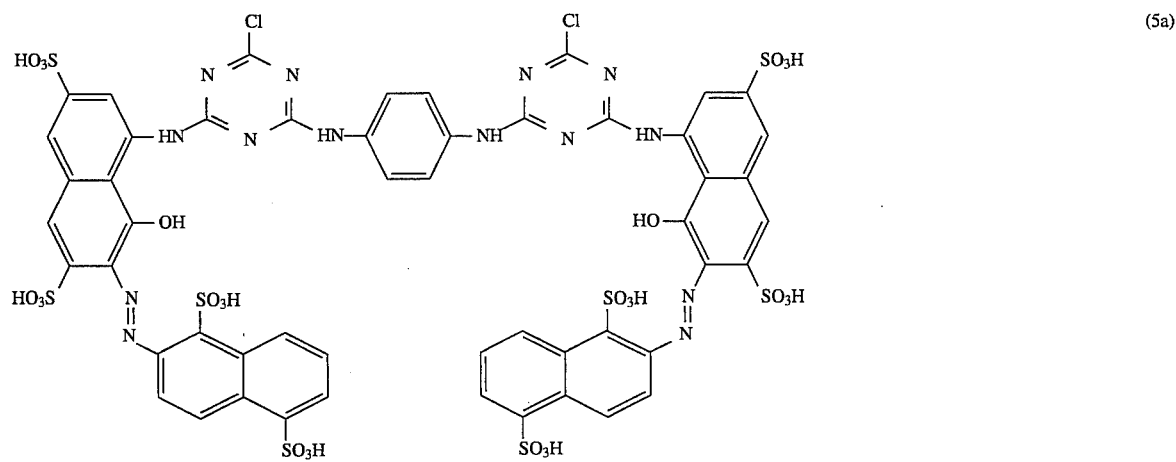

(5a)

is used.

hue. Preferably, the further dyes used are those having two or three sulfo groups.

Owing to their good compatibility with the dyes of the formulae (1), (2), (2a) or (3), the additional dyes used are in particular brown dyes of the formula

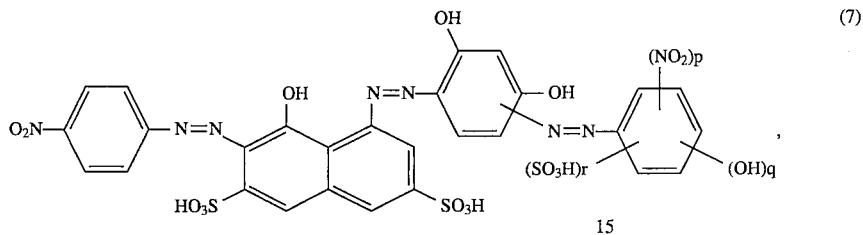

in which p is 1 or 2 and q and r, independently of one another, are each 0 or 1, or of the formula

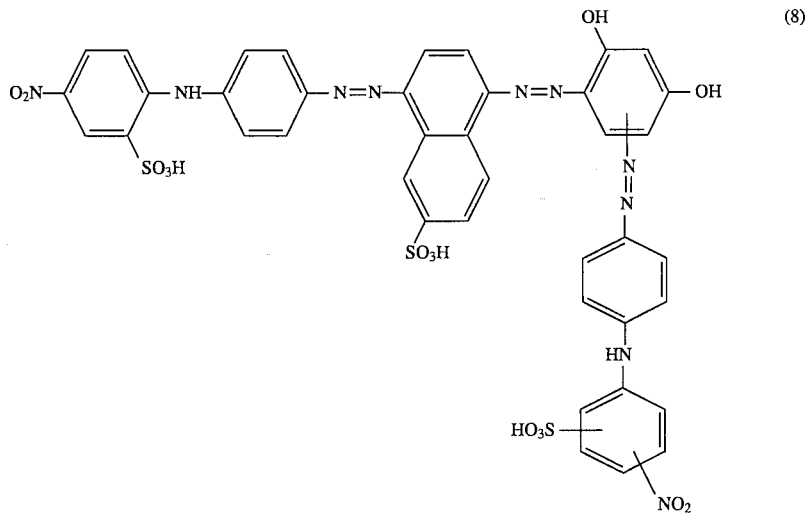

or black dyes of the formula

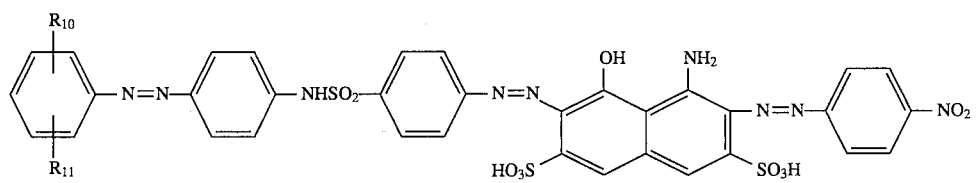

or

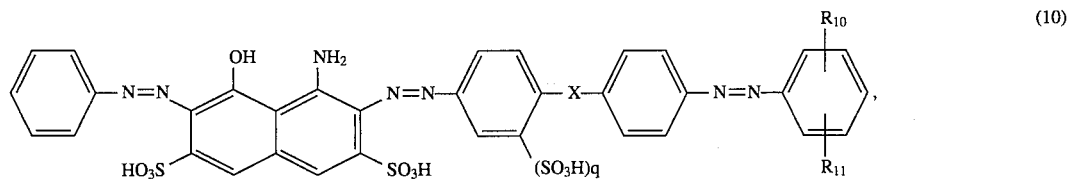

in which $R_{10}$ and $R_{11}$, independently of one another, are each OH or $NH_2$, X is —NH— or —NHCO— and q is 0 or 1.

The additional dyes used are preferably brown dyes of the formula

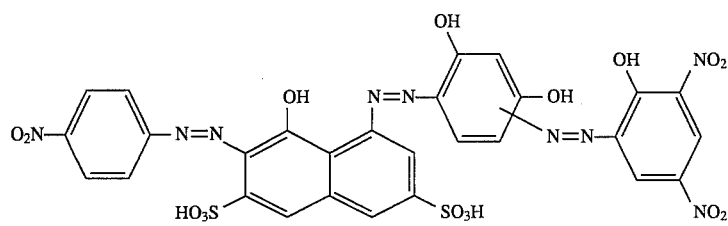
(11)
or
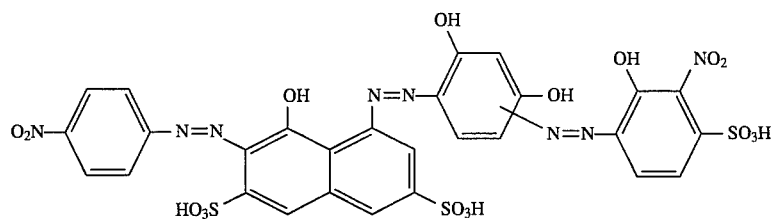
(11a)
or
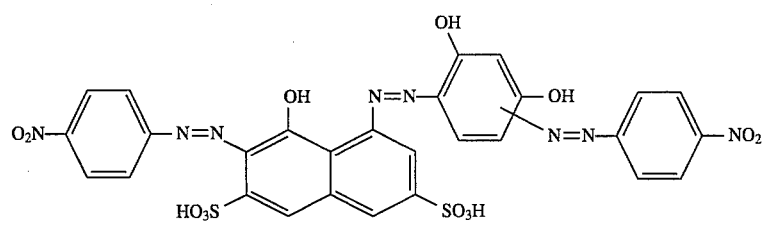
(12)
or
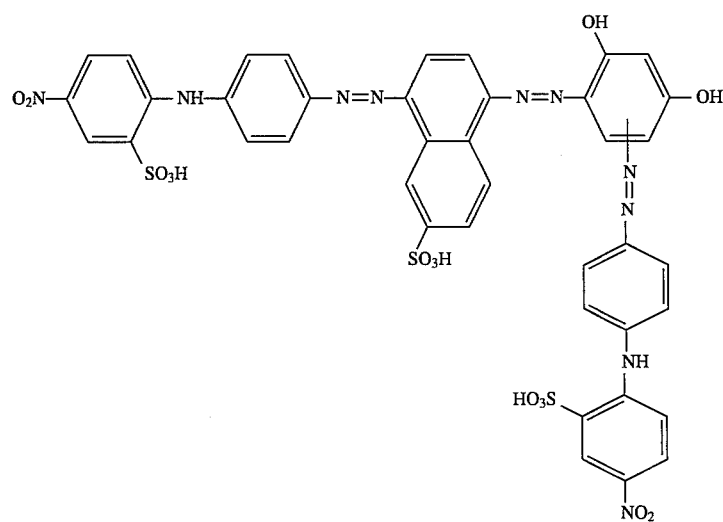
(13)
or black dyes of the formula
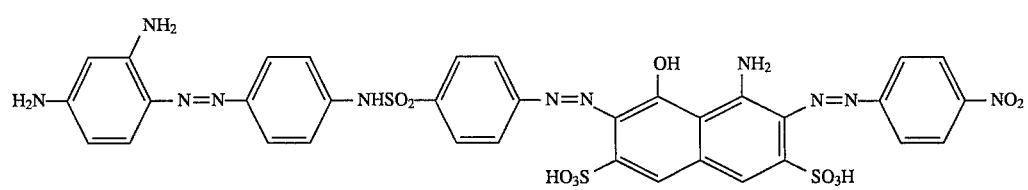
(14)
or

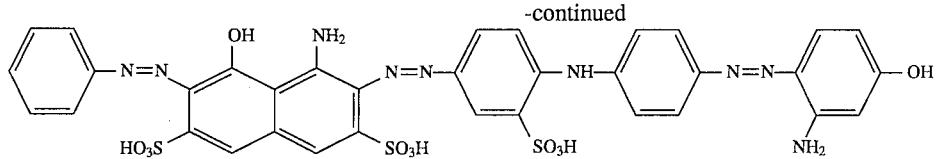

(15)

or

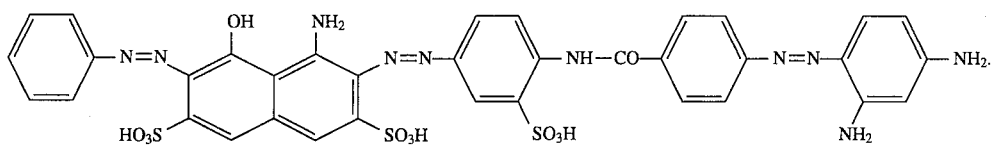

(15a)

The dyes according to the invention are of anionic nature and are advantageously used in the form of their salts, in particular the alkali metal salts or ammonium salts. Suitable alkali metal salts are in particular lithium salts, potassium salts or sodium salts and ammonium salts are also understood to mean salts of organic amines, for example of those substituted by $C_1$–$C_6$alkyl or hydroxy-$C_1$–$C_6$alkyl groups.

The dyes used in the process according to the invention are known or can be prepared in a manner known per se.

The amounts in which the dyes used according to the invention are used in the dye baths can vary within wide limits, depending on the desired colour depth. In general, advantageous amounts of dye are 0.1 to 10, preferably 0.5 to 4, % by weight, relative to the weight of the leather to be dyed.

The dye liquor can contain, in addition to water and dyes, further additives, for example acids, bases or salts for adjusting the desired pH, and auxiliaries, for example wetting agents, fat-liquoring agents, colour-intensifying auxiliaries, levelling agents, penetrating agents and/or antifoams.

The process according to the invention has the great advantage that it is not only suitable for a specific leather type but for various leather types, for example for chrome leather, retanned leathers or goat, cow or pig velour leather.

The dyeing is preferably carried out by the exhaust method, for example at a liquor ratio of 1.5:1 to 20:1, preferably 2:1 to 10:1, and at temperatures of 20° to 100° C., preferably 30° to 60° C. If desired or required, the leather can be subjected to a pretreatment, for example to neutralisation or filling.

Depending on the type of leather and the desired colour depth, the dyeing time varies but is in general between 30 and 180 minutes. After dyeing, the leather is rinsed and finished in the usual manner.

The process according to the invention produces leather dyeings in brilliant shades and with good fastness properties, for example light and wet fastness properties. Since the individual dyes penetrate the leather to approximately the same extent, the shade of the dyeings on the surface and in deeper layers of the leather is the same.

For use in dyeing, the individual dyes are mixed with one another. The dyes can be prepared individually for the dyeing process as stock solutions or can be formulated together to give a single stock solution.

The invention also relates to trichromatic dye mixtures comprising at least one yellow dye of the formula (1), at least one red dye of the formula (2) or (2a) and at least one blue dye of the formula (3).

Preferred trichromatic dye mixtures comprise 1 to 98% by weight of a yellow dye of the formula (1), 1 to 98% by weight of a red dye of the formula (2) or (2a) and 1 to 98% by weight of a blue dye of the formula (3), in particular 10 to 70% by weight of a yellow dye of the formula (1), 10 to 50% by weight of a red dye of the formula (2) and 10 to 50% by weight of a blue dye of the formula (3).

The examples which follow illustrate the invention without limiting it thereto. Parts and percentages are by weight. The dyes are used in the commercially available pulverulent or liquid form; the amounts of dye given are based on the diluent-incorporating 100% dye commercial form.

EXAMPLE 1

100 parts of chrome-tanned cow leather (shaved weight) are washed in 300 parts of water at 30° C. for 15 minutes and then neutralised in a liquor consisting of 300 parts of water, 2 parts of neutralising agent (sodium salts of aromatic sulfonic acids and aliphatic dicarboxylic acids) and 0.5 part of sodium bicarbonate at 30° C. for 60 minutes. This is followed by a wash of 15 minutes in 300 parts of water at room temperature.

The leather thus treated is then dyed in a freshly prepared liquor consisting of 300 parts of water and 0.79 part of the dye mixture comprising 0.39 part of the yellow dye of the formula

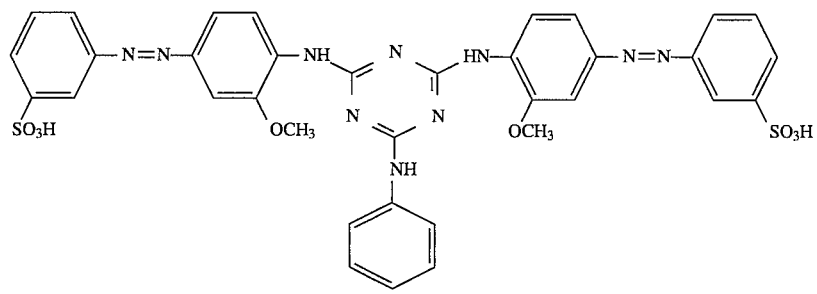

(4)

and 0.40 part of the blue dye of the formula

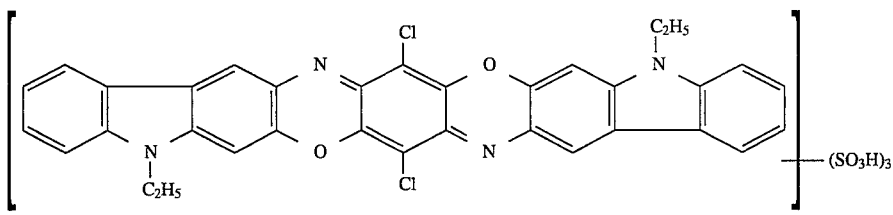

at 50° C. for 30 minutes. 3 parts of a synthetic fat-liquoring agent (a preparation based on sulfonated aliphatic hydrocarbons, fatty acids and derivatives thereof) are then added to the dye liquor, and after a further 30 minutes, 0.5 part of 85% formic acid is added. Dyeing at the same temperature is continued for 30 minutes, and the dyed leather is rinsed and finished in the usual manner.

This gives a level green dyeing on the leather having good fastness properties and a pure shade. The compatibility of the dyes used is particularly good. Slight buffing of the leather surface reveals that both dyes have dyed the leather to the same depth.

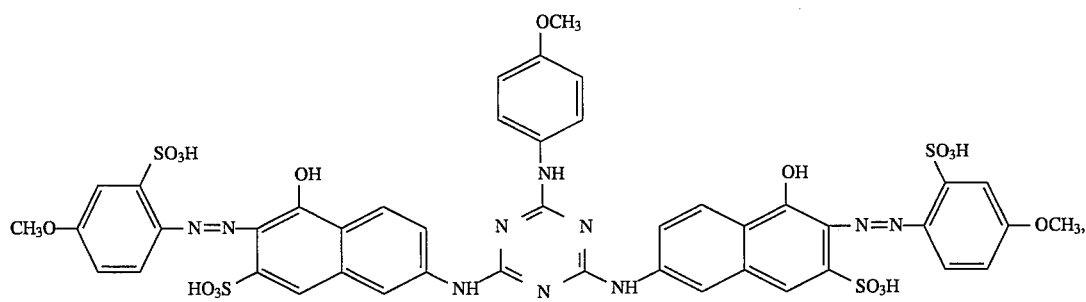

EXAMPLE 2

100 parts of chrome cowhide (shaved weight) are neutralised by the procedure of Example 1 and then treated at 30° C. in the same liquor with 7 parts of a liquid synthetic retanning agent (condensation products of polyphenolic sulfonic acids with formaldehyde and urea) for another 60 minutes. This is followed by a wash of 15 minutes in 300 parts of water at room temperature. This retanned chrome cowhide is then dyed at 50° C. in a liquor consisting of 300 parts of water and 1.58 parts of the dye mixture used in Example 1. After a dyeing time of 30 minutes, 3 parts of the synthetic fat-liquoring agent from Example 1 and after another 30 minutes 1 part of 85% formic acid are added. After acidification the treatment is continued at 50° C. for another 30 minutes. The leather is then rinsed in cold water and finished. The pure green dyeing obtained is distinguished by good fastness properties and a pure shade. Compatibility of the dyes, which is tested as in Example 1, is also very good on this leather. Moreover, the dyeing largely matches the dyeing obtained by Example 1 with the same dye mixture on non-retanned chrome cowhide with respect to the hue.

EXAMPLE 3

The procedure described in Example 2 is repeated, except that 3 parts of a strongly anionic retanning material (condensation product of phenolic sulfonic acids with formaldehyde) are used instead of the retanning agent used there, giving leather having a very anionic surface.

The dyeing obtained largely matches that obtained by Example 1 on non-retanned chrome cowhide and that obtained by Example 2 on retanned chrome cowhide with respect to the hue.

EXAMPLE 4

The procedure described in Example 1 is repeated, except that 0.72 part of a dye mixture consisting of 0.22 part of the yellow dye of the formula (4), 0.33 part of the blue dye of the formula (6) and 0.17 part of the red dye of the formula (5) is used instead of the dye mixture used there, the dyeing obtained on the leather being a strong medium brown.

The compatibility of the dyes is very good. Slight buffing of the leather surface reveals that all dyes dye leather to the same depth.

EXAMPLE 5

The procedure described in Example 2 is repeated, except that 1.44 parts of the dye mixture used in Example 4 are used instead of the dye mixture used there, giving a dye which likewise matches the dye obtained by Example 4 on non-retanned chrome cowhide with respect to the hue.

EXAMPLE 6

100 parts of chrome cowhide (shaved weight) are neutralised by the procedure of Example 2 and retanned and then dyed in a liquor containing 300 parts of water, 0.52 part of the dye of the formula (4) and 0.54 part of the dye of the formula (6) at 50° C. for 30 minutes. After 30 minutes, 3 parts of the synthetic fat-liquoring agent from Example 1 and after another 30 minutes 1 part of 85% formic acid are added. After acidification, the treatment is continued at 50° C. for another 30 minutes.

The leather is then additionally subjected in a fresh bath to an aftertreatment with 1 part of a colour-intensifying auxiliary (polyquaternary amine/ethylene oxide adduct) in 300 parts of water. After a treatment time of 15 minutes, half the amount of the abovementioned dyes is added to the dye bath, and dyeing is then continued at 50° C. for 15 minutes.

0.25 part of 85% formic acid is then added. After another 20 minutes, dyeing is complete. The leather is then rinsed in cold water.

The dyeing which is finished in the usual manner is distinguished by good fastness properties and a full, pure green shade. It is much fuller and stronger than an analogous dye without the colour-intensifying auxiliary. The same results are also obtained with other dye mixtures comprising the dyes of the formulae (4), (5) and (6).

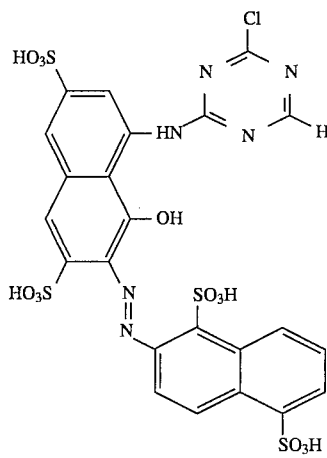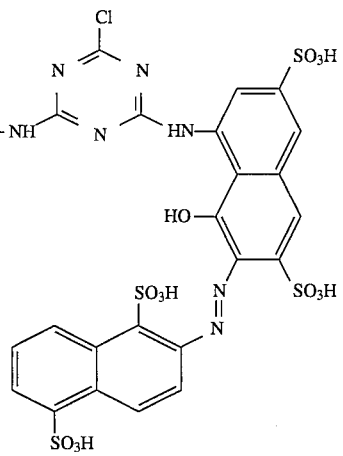

(5a)

EXAMPLE 7

100 parts of chrome-tanned garment velour leather (dry weight) are welted back at 50° C. for 60 minutes in a solution of 1000 parts of water and 2 parts of 24% ammonia. This is followed by a 15-minute wash in 1000 parts of water at 50° C.

After these preparatory operations, the leather is dyed at 50° C. in a liquor of 1000 parts of water, 2 parts of 24% ammonia and 6.32 parts of the dye mixture used in Example 1.

After a dyeing time of 60 minutes, the liquor is acidified with 4 parts of 85% formic acid, and dyeing is then continued for another 20 minutes.

After a treatment of 45 minutes at 50° C. in a fresh bath with 1000 parts of water, 2.5 parts of a condensation product of formaldehyde, dicyandiamide, ammonium chloride and ethylenediamine and 0.5 part of 85% formic acid, the dyed leather is finished. The dyed leather obtained has a pure green shade. It is distinguished by good fastness properties and good hiding power.

EXAMPLE 8

100 parts of chrome split velour leather (dry weight) are welted back for 60 minutes at 50° C. in 1000 parts of water and 2 parts of 24% ammonia and then washed with 1000 parts of water at 50° C. for 15 minutes.

The leather thus prepared is then dyed at 50° C. in a fresh liquor comprising 1000 parts of water, 2 parts of 24% ammonia and 3.16 parts of the dye mixture used in Example 1. After 60 minutes, 4 parts of 85% formic acid are added, and dyeing at this temperature is continued for 20 minutes.

The dyed leather is rinsed in cold water and finished, giving a pure green dyeing which is distinguished by good fastness properties and equality of shade between velour side and flesh side.

EXAMPLE 9

The procedure described in Example 1 is repeated, except that 0.88 part of a dye mixture consisting of 0.48 part of the red dye of the formula and 0.40 part of the blue dye of the formula (6) is used instead of the dye mixture used there, the dyeing obtained on the leather being a strong violet.

EXAMPLE 10

The procedure described in Example 2 is repeated, except that 1.76 parts of the dye mixture used in Example 9 are used instead of the dye mixture used there, giving a dyeing which likewise matches the dyeing obtained by Example 9 on the non-retanned chrome cowhide with respect to the hue.

EXAMPLE 11

The procedure described in Example 1 is repeated, except that 0.75 part of a dye mixture consisting of 0.25 part of the red dye of the formula (5) given in Example 4 and 0.5 part of the blue dye of the formula (6) is used instead of the dye mixture used there, the dyeing obtained on the leather being a strong violet.

EXAMPLE 12

The procedure described in Example 2 is repeated, except that 1.50 parts of the dye mixture used in Example 11 are used instead of the dye mixture used there, giving a dyeing which likewise matches the dyeing obtained by Example 11 on non-retanned chrome cowhide with respect to the hue.

EXAMPLE 13

The procedure described in Example 1 is repeated, except that 0.84 part of a dye mixture consisting of 0.34 part of the yellow dye of the formula (4) given in Example 1 and 0.25 part of the brown dye of the formula

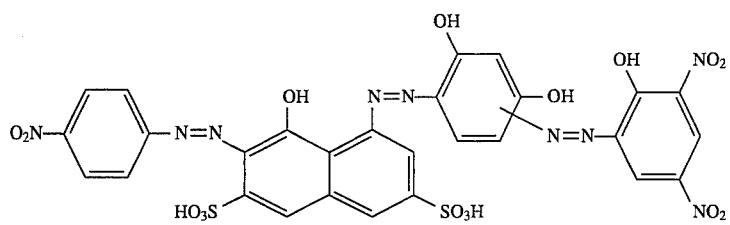

(11)

and 0.25 part of the brown dye of the formula

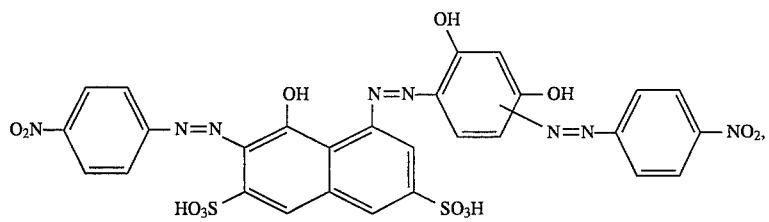

(12)

is used instead of the dye mixture used there, the dyeing obtained on the leather being a strong medium-brown.

EXAMPLE 14

The procedure described in Example 1 is repeated, except that 1.0 part of a dye mixture consisting of 0.5 part of the black dye of the formula

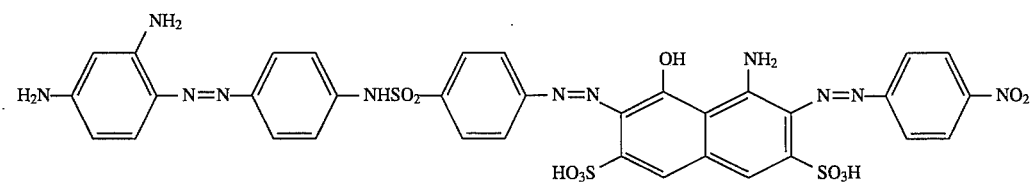

and 0.5 part of the blue dye of the formula (6) given in Example 1 is used instead of the dye mixture used there, the dyeing obtained on the leather being a strong navy.

EXAMPLE 15

The procedure described in Example 2 is repeated, except that 2.0 parts of the dye mixture used in Example 14 are used instead of the dye mixture used there, giving a dyeing which likewise matches the dyeing obtained by Example 14 on the non-retanned chrome cowhide with respect to the hue.

EXAMPLE 16

The procedure described in Example 1 is repeated, except that 0.84 part of a dye mixture consisting of 0.34 part of the yellow dye of the formula (4) given in Example 1 and 0.5 part of the brown dye of the formula (14)

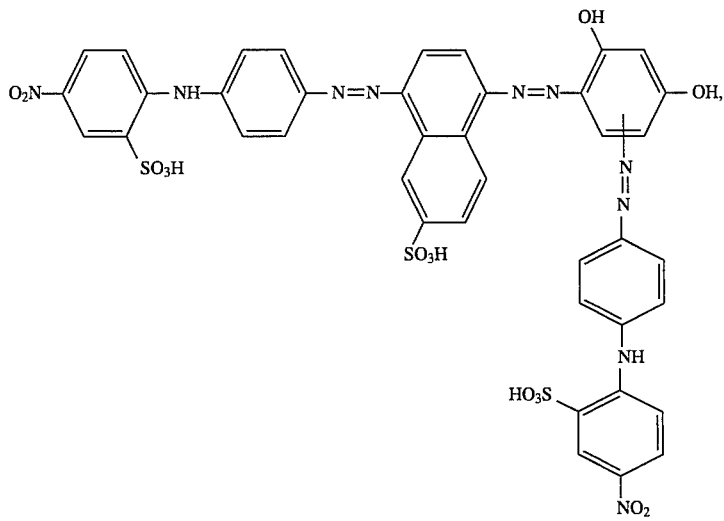

(13)

is used instead of the dye mixture used there, the dyeing obtained on the leather being a strong dark brown.

EXAMPLE 17

The procedure described in Example 1 is repeated, except that 1.0 part of a dye mixture consisting of 0.5 part of the blue dye of the formula (6) given in Example 1 and 0.5 part of the black dye of the formula

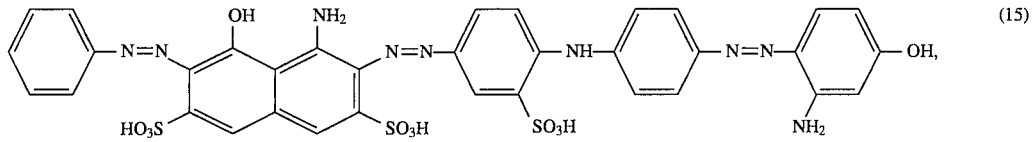

is used instead of the dye mixture used there, the dyeing obtained on the leather being a strong dark blue.

EXAMPLE 18

The procedure described in Example 1 is repeated, except that 1.0 part of a dye mixture consisting of 0.25 part of the brown dye of the formula (11), 0.25 part of the brown dye of the formula (12) and 0.50 part of the blue dye of the formula (6) given in Example 1 is used instead of the dye mixture used there, the dyeing obtained on the leather being a strong dark grey.

EXAMPLES 19 TO 35

The procedures described in Examples 1, 2 and 4 are repeated, using the yellow dye of the formula (4), the red dye of the formula (5) and the blue dye of the formula (6) listed there in the amounts given (parts), giving leather dyeings in the shades mentioned.

| Example | Dye (4) | Dye (5) | Dye (6) | Shade |
|---|---|---|---|---|
| 19 | 0.33 | 0.13 | 0.25 | greenish brown |
| 20 | 0.16 | 0.25 | 0.25 | reddish brown |
| 21 | 0.40 | 0.05 | 0.30 | greenish grey |
| 22 | 0.16 | 0.13 | 0.50 | brown |
| 23 | 0.28 | 0.07 | 0.43 | dark-green |
| 24 | 0.20 | 0.30 | 0.10 | orange-brown |
| 25 | 0.07 | 0.15 | 0.60 | violet |
| 26 | 0.10 | 0.35 | 0.15 | bordeaux |
| 27 | 0.07 | 0.30 | 0.30 | bluish bordeaux |
| 28 | 0.44 | 0.17 | — | reddish orange |
| 29 | 0.33 | 0.25 | — | scarlet red |
| 30 | 0.22 | 0.34 | — | neutral red |
| 31 | — | 0.10 | 0.80 | violet |
| 32 | — | 0.30 | 0.40 | reddish violet |
| 33 | — | 0.40 | 0.20 | bluish bordeaux |
| 34 | 0.13 | — | 0.80 | bluish green |
| 35 | 0.26 | — | 0.60 | green |

EXAMPLE 36

The procedures described in Examples 1 to 4 are repeated, using 0.25 part of the red dye of the formula (5) listed there, 0.10 part of the blue dye of the formula (6) and 1.0 part of the black dye of the formula (15) used in Example 17, giving leather dyeings in a muted violet shade.

EXAMPLE 37

The procedures described in Examples 1 to 4 are repeated, using 0.07 part of the yellow dye of the formula (4) listed there, 0.10 part of the red dye of the formula (5) and 0.35 part of the brown dye of the formula (11) used in Example 13 and 0.35 part of the brown dye of the formula (12) used in Example 13, giving leather dyeings in an orange-brown shade.

EXAMPLE 38

The procedure described in Example 1 is repeated, except that 1.0 part of a dye mixture consisting of 0.5 part of the brown dye of the formula (13) and 0.50 part of the blue dye of the formula (6) given in Example 1 is used instead of the dye mixture used there, the dyeing obtained on the leather being a strong grey-violet.

EXAMPLE 39

The procedure described in Example 13 is repeated, except that the same amount of the brown dye of the formula

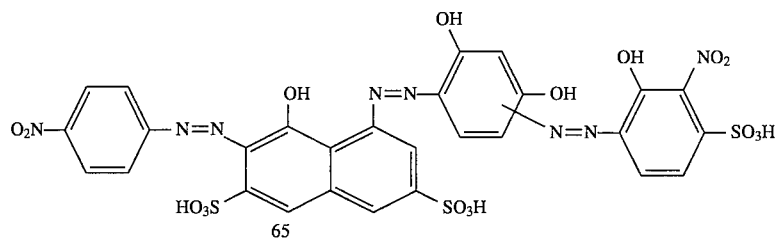

is used instead of the brown dye of the formula (12) used there, likewise the dyeing obtained on the leather being a strong medium-brown.

EXAMPLE 40

The procedure described in Example 17 is repeated, except that the same amount of the black dye of the formula

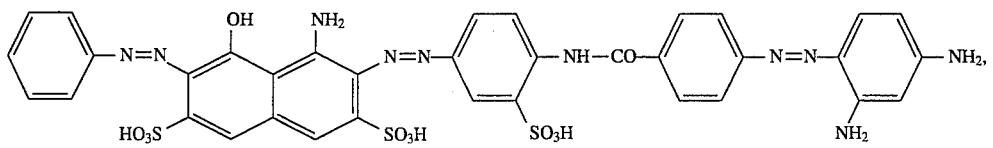

is used instead of the black dye of the formula (15) used there, likewise the dyeing obtained on the leather being a strong dark blue.

What is claimed is:

1. A process of dyeing leather with a dye mixture, which comprises applying a tinctorally effective amount of a dye mixture to the leather, which dye mixture comprises at least two metal-free dyes having a different color from each other, which color is selected from the group consisting of yellow, red and blue, which dyes are selected from the group consisting of a) a yellow dye of the formula

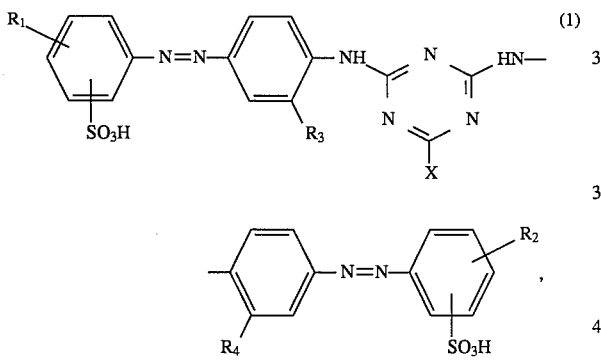

in which $R_1$ and $R_2$, independently of one another, are each hydrogen, $C_1$–$C_4$alkyl or $C_1$–$C_4$alkoxy, $R_3$ and $R_4$, independently of one another, are each $C_1$–$C_4$alkyl or $C_1$–$C_4$alkoxy and X is halogen or

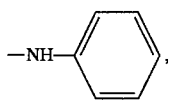

the phenyl radical being unsubstituted or substituted by $C_1$–$C_4$alkyl or $C_1$–$C_4$alkoxy, b) a red dye of the formula

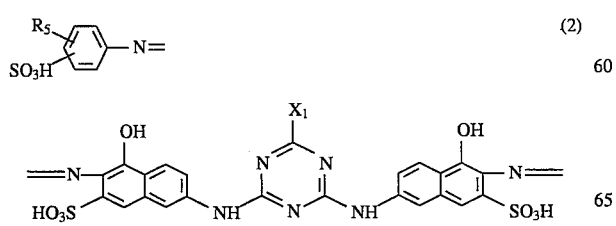

in which

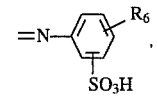

$R_5$ and $R_6$, independently of one another, are each hydrogen, $C_1$–$C_4$alkyl or $C_1$–$C_4$alkoxy and $X_1$ is halogen or

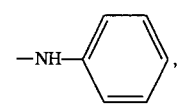

the phenyl radical being unsubstituted or substituted by $C_1$–$C_4$alkyl or $C_1$–$C_4$alkoxy, or of the formula

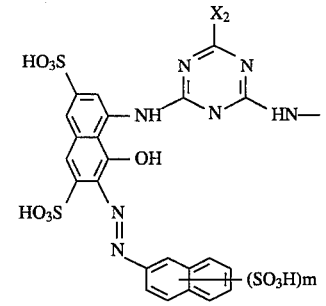

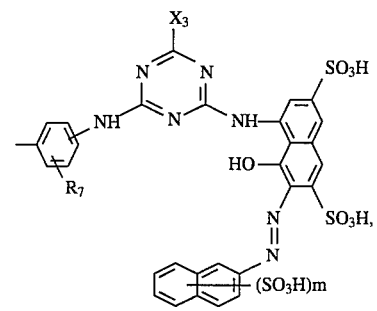

in which $X_2$ and $X_3$, independently of one another, are each halogen or

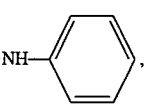

the phenyl radical being unsubstituted or substituted by $C_1$–$C_4$alkyl or $C_1$–$C_4$alkoxy, $R_7$ is hydrogen, $C_1$–$C_4$alkyl or $C_1$–$C_4$alkoxy and m is 1 or 2, and c) a blue dye of the formula

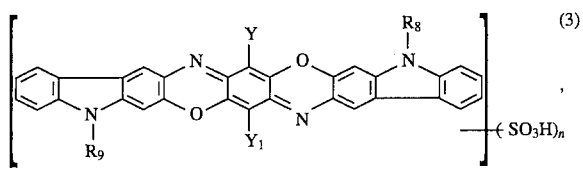

in which n is 3 or 4, $R_8$ and $R_9$, independently of one another, are each hydrogen or $C_1$–$C_4$alkyl and Y and $Y_1$, independently of one another, are each hydrogen, halogen, $C_1$–$C_4$alkyl, $C_1$–$C_4$alkoxy, phenyl or phenoxy, it being possible for the phenyl radical in the last two groups to be substituted by $C_1$–$C_4$alkyl or $C_1$–$C_4$alkoxy.

2. A process according to claim 1, wherein a dye mixture comprising a yellow dye of the formula (1), a red dye of the formula (2) or (2a) and a blue dye of the formula (3) is applied to the leather for trichromatic dyeing.

3. A process according to claim 1, wherein the dye mixture contains a yellow dye of the formula (1) in which $R_1$ has the same meaning as $R_2$.

4. A process according to claim 1, wherein the dye mixture contains a yellow dye of the formula (1) in which $R_1$ and $R_2$ are both hydrogen, methyl or methoxy.

5. A process according to claim 1, wherein the dye mixture contains a yellow dye of the formula (1) in which both sulfo groups are in the meta position relative to the azo groups.

6. A process according to claim 1, wherein the dye mixture contains a yellow dye of the formula (1) in which X is chlorine or phenylamino.

7. A process according to claim 1, wherein the yellow dye is of the formula

9. A process according to claim 1, wherein the dye mixture contains a red dye of the formula (2) in which $R_5$ and $R_6$ are both hydrogen, methyl or methoxy.

10. A process according to claim 1, wherein the dye mixture contains a red dye of the formula (2) in which both sulfo groups are in the ortho position relative to the azo groups.

11. A process according to claim 1, wherein the dye mixture contains a red dye of the formula (2) in which $X_1$ is phenylamino or phenylamino which is substituted by methyl, ethyl, methoxy or ethoxy.

12. A process according to claim 1, wherein the dye mixture contains a red dye of the formula (2a) in which $R_7$ is hydrogen.

13. A process according to claim 1, wherein the dye mixture contains a red dye of the formula (2a) in which both triazineamino groups are attached to the $R_7$-substituted phenylene radical in the para position.

14. A process according to claim 1, wherein the dye mixture contains a red dye of the formula (2a) in which $X_2$ and $X_3$ are identical.

15. A process according to claim 1, wherein the dye mixture contains a red dye of the formula (2a) in which $X_2$ and $X_3$ are each chlorine.

16. A process according to claim 1, wherein the dye mixture contains a red dye of the formula (2a) in which m is 2.

17. A process according to claim 1, wherein the red dye is of the formula

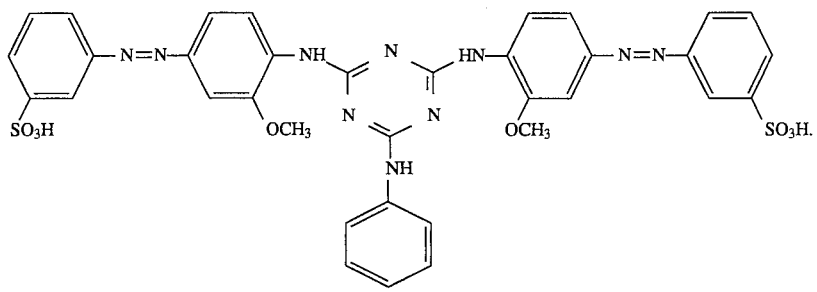

8. A process according to claim 1, wherein the dye mixture contains a red dye of the formula (2) in which $R_5$ has the same meaning as $R_6$.

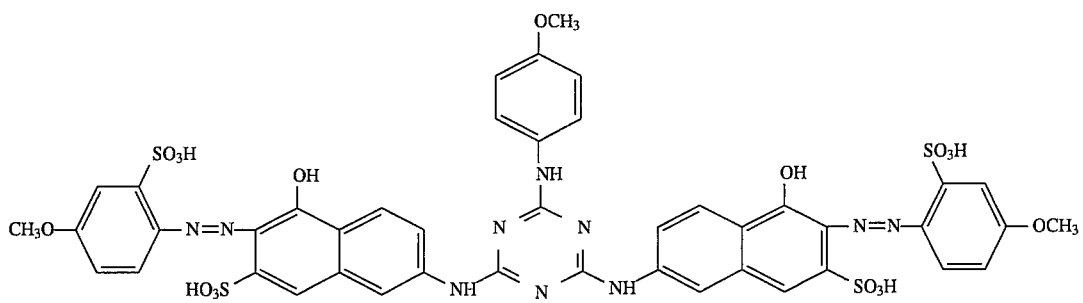
(5)

or

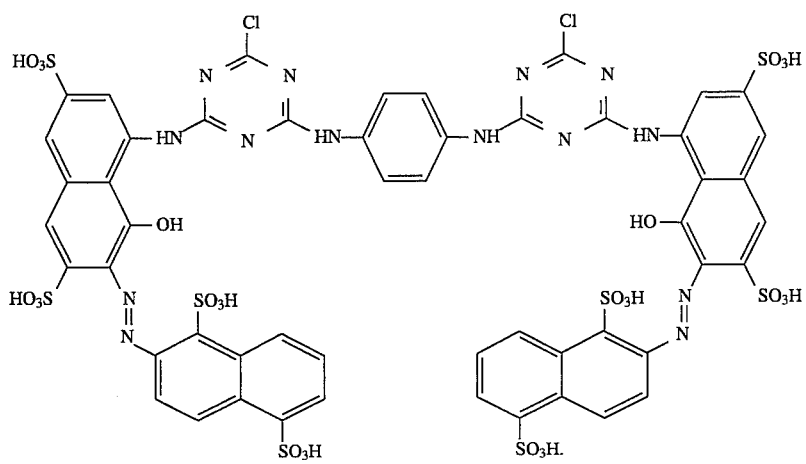
(5a)

18. A process according to claim 1, wherein the dye mixture contains a blue dye of the formula (3) in which $R_8$ and $R_9$ are each $C_1$–$C_2$alkyl.

19. A process according to claim 1, wherein the dye mixture contains a blue dye of the formula (3) in which Y and $Y_1$ are each halogen, in particular chlorine.

20. A process according to claim 1, wherein the dye mixture contains a blue dye of the formula (3) in which n is 3.

21. A process according to claim 1, wherein the blue dye is of the formula

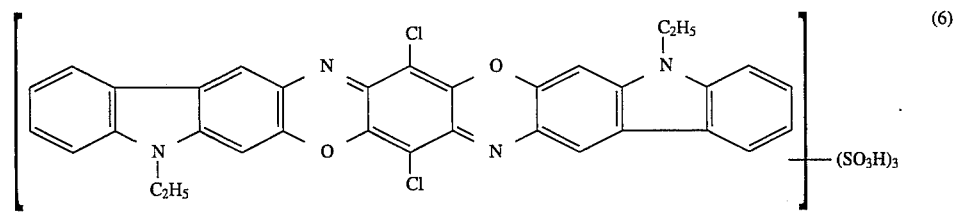
(6)

22. A process according to claim 1, wherein a brown dye of the formula

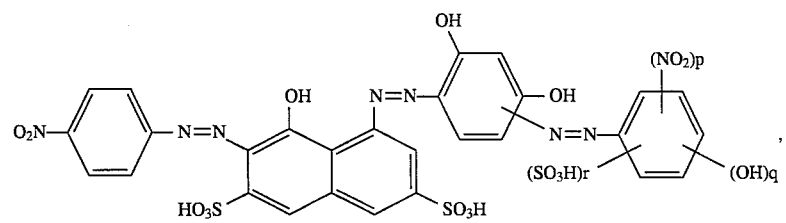
(7)

in which p is 1 or 2 and q and r, independently of one another, are each 0 or 1, or a brown dye of the formula

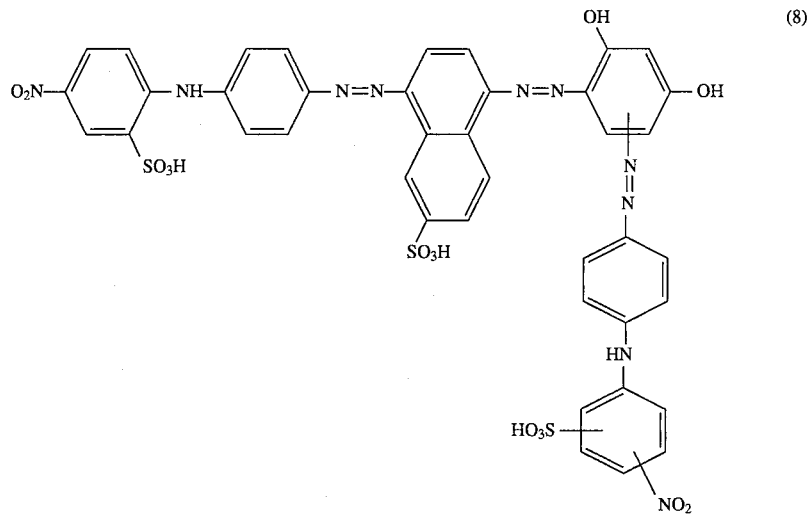
(8)
is additionally present in the dye mixture.
23. A process according to claim 1, wherein a black dye of the formula
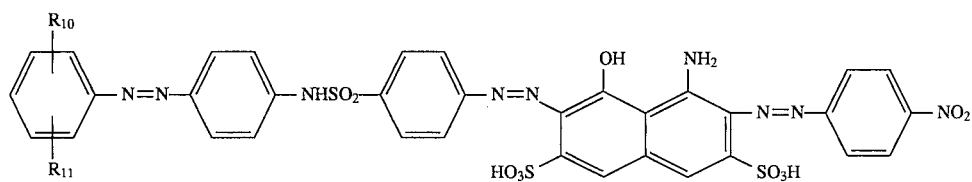
or
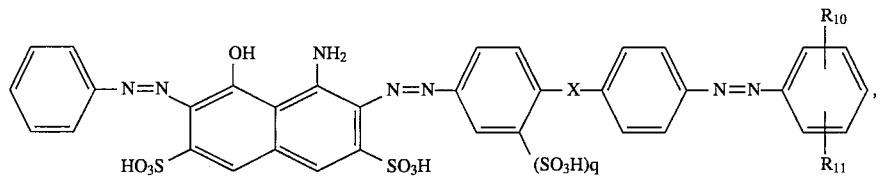
in which $R_{10}$ and $R_{11}$, independently of one another, are each OH or $NH_2$, X is —NH— or —NHCO— and q is 0 or 1, is
additionally present in the dye mixture.
24. A process according to claim 22, wherein a brown dye of the formula
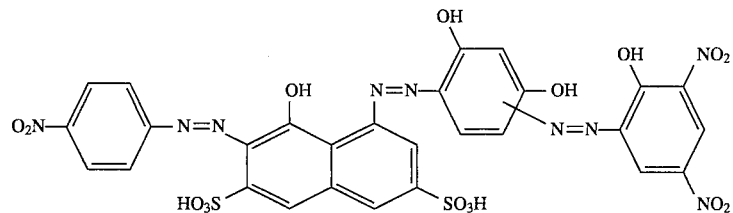
or
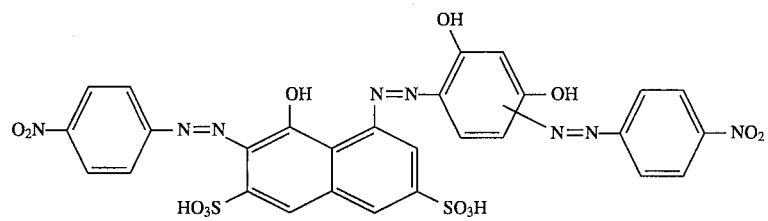
or -continued
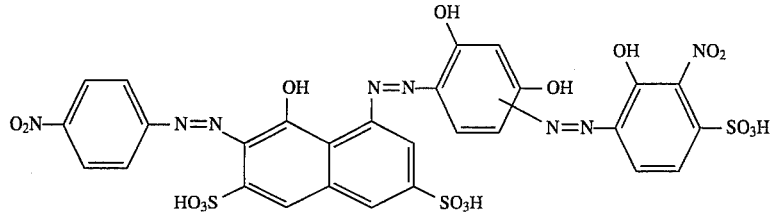 (11a)
or
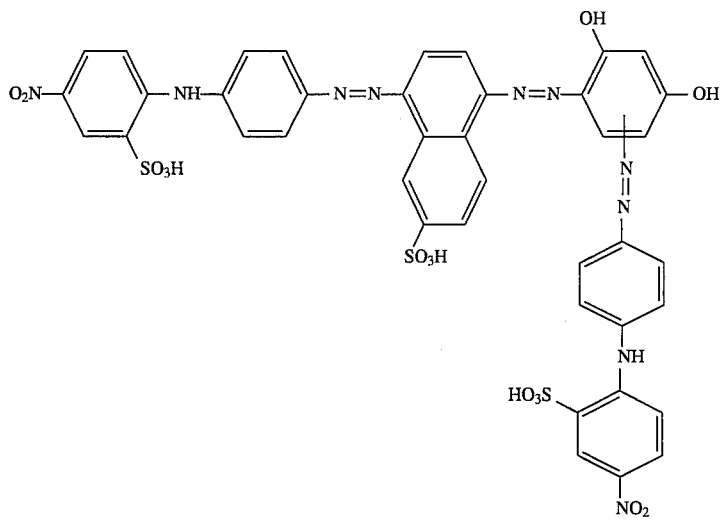 (13)
is additionally present in the dye mixture.
25. A process according to claim 23, wherein a black dye of the formula
26. A process according to claim 1, wherein the dye mixture comprises the yellow dye of the formula (4)
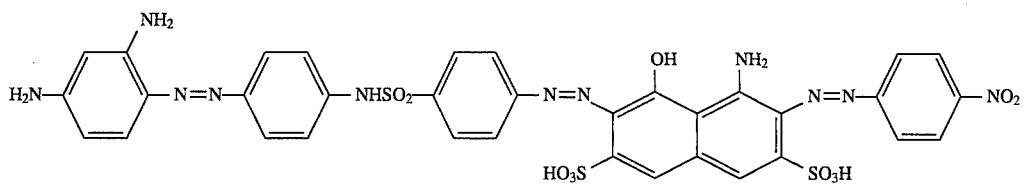 (14)
or
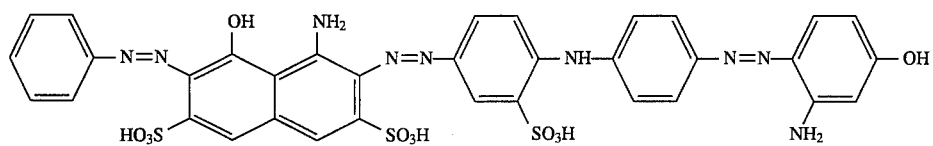 (15)
or
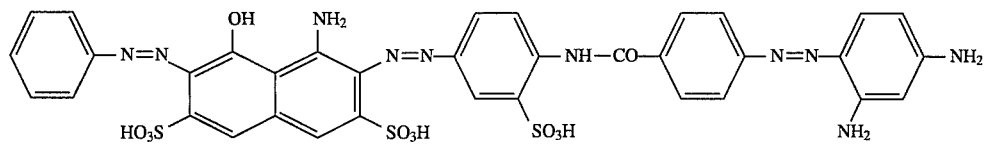 (15a)
is additionally present in the dye mixture.

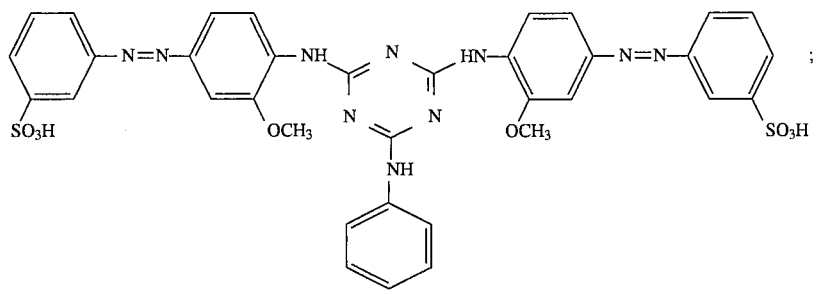

the red dye of formula (5)

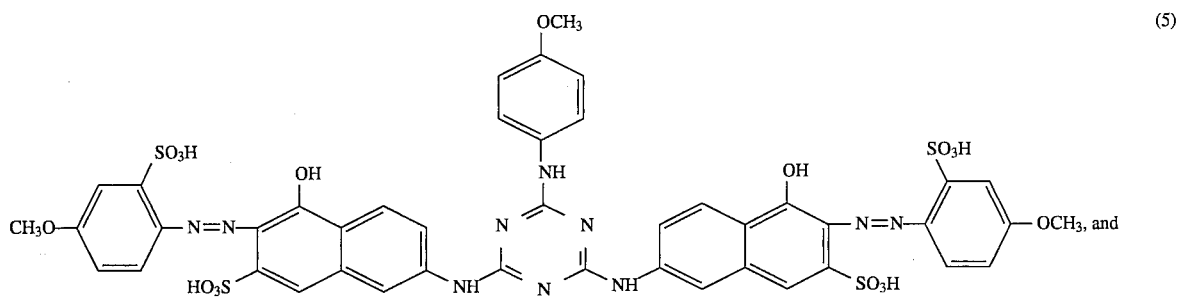

the blue dye of formula (6)

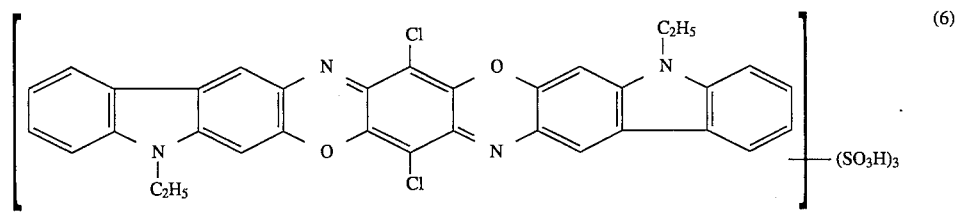

27. A process according to claim 1, wherein the dye mixture is applied to the leather by means of dye liquor which additionally contains a colour-intensifying auxiliary.

28. A process according to claim 27 wherein said dye liquor contains an ethoxylated alkylamine as the colour-intensifying auxiliary.

29. A trichromatic dye mixture, which comprises a yellow dye, a red dye and a blue dye wherein (a) the yellow dye is of the formula

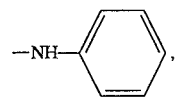

the phenyl radical being unsubstituted or substituted by $C_1$–$C_4$alkyl or $C_1$–$C_4$alkoxy, (b) the red dye is of the formula

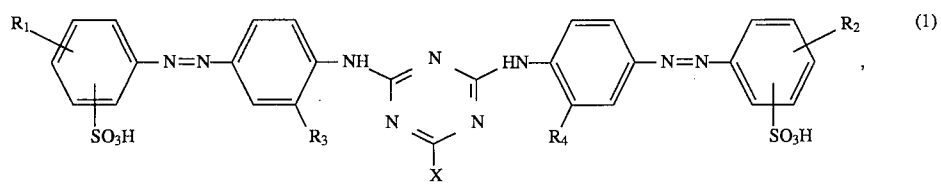

in which $R_1$ and $R_2$, independently of one another, are each hydrogen, $C_1$–$C_4$alkyl or $C_1$–$C_4$alkoxy, $R_3$ and $R_4$, independently of one another, are each $C_1$–$C_4$alkyl or $C_1$–$C_4$alkoxy and X is halogen or

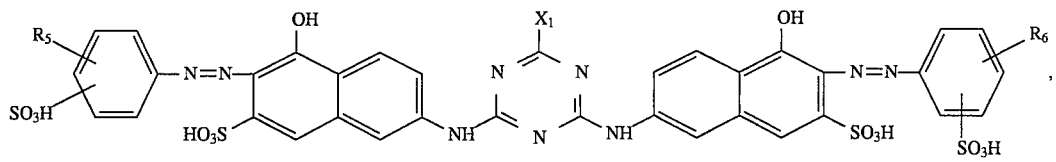

in which

R₅ and R₆, independently of one another, are each hydrogen, $C_1$–$C_4$alkyl or $C_1$–$C_4$alkoxy and X₁ is halogen or

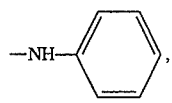

the phenyl radical being unsubstituted or substituted by $C_1$–$C_4$alkyl or $C_1$–$C_4$alkoxy, or of the formula

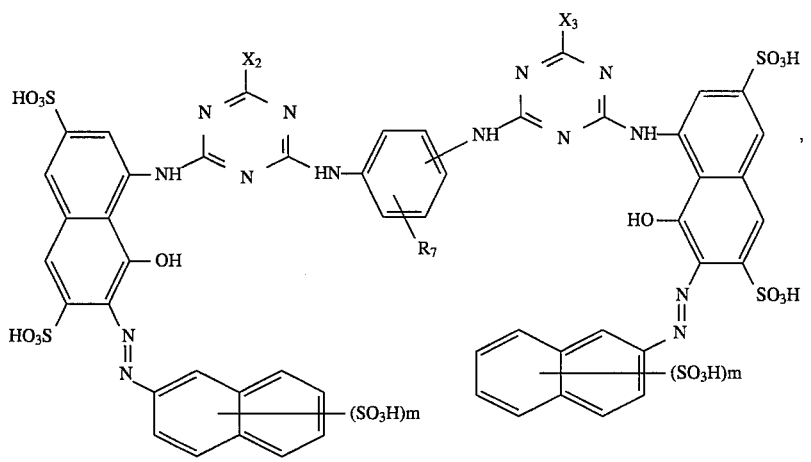

in which

X₂ and X₃, independently of one another, are each halogen or

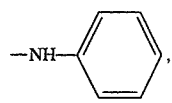

the phenyl radical being unsubstituted or substituted by $C_1$–$C_4$alkyl or $C_1$–$C_4$alkoxy, R₇ is hydrogen, $C_1$–$C_4$alkyl or $C_1$–$C_4$alkoxy and

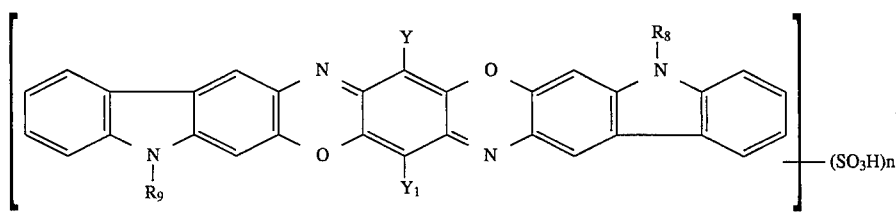

m is 1 or 2, and (c) the blue dye is of the formula in which n is 3 or 4,

R₈ and R₉, independently of one another, are each hydrogen or $C_1$–$C_4$alkyl and Y and $Y_1$, independently of one another, are each hydrogen, halogen, $C_1$–$C_4$alkyl, $C_1$–$C_4$alkoxy, phenyl or phenoxy, it being possible for the phenyl radical in the last two groups to be substituted by $C_1$–$C_4$alkyl or $C_1$–$C_4$alkoxy.

30. A trichromatic dye mixture according to claim 29, comprising 1 to 98% by weight of a yellow dye of the formula (1), 1 to 98% by weight of a red dye of the formula (2) or (2a) and 1 to 98% by weight of a blue dye of the formula (3).

31. A trichromatic dye mixture according to claim 30, comprising 10 to 70% by weight of a yellow dye of the formula (1), 10 to 50% by weight of a red dye of the formula (2) and 10 to 50% by weight of a blue dye of the formula (3).

* * * * *